United States Patent Office 2,860,120
Patented Nov. 11, 1958

2,860,120

RESINS OF EPOXY COMPOUNDS AND POLYMERS OF ALKYL SUBSTITUTED VINYLPYRIDINES AND THE LIKE

James E. Pritchard and Peter J. Canterino, Bartlesville, Okla., assignors to Phillips Petroleum Company, a corporation of Delaware No Drawing. Application July 23, 1954
Serial No. 445,457

8 Claims. (Cl. 260—45.5)

This invention relates to thermosetting resins. In a further aspect, this invention relates to resins which are produced by the reaction of epoxy compounds with polymers (this term including copolymers) of $CH_2=C<$ substituted heterocyclic nitrogen bases having alkyl groups in the 2 and/or 4 positions on the heterocyclic ring of pyridine or quinoline (the 1 and/or 3 positions of isoquinoline). In a further aspect, this invention relates to resins produced by the reaction of epoxy compounds and polymers of 2- and 4-methyl-vinylpyridine polymers. In a further aspect, this invention relates to a method for the production of these resins.

The products produced according to this invention are new compositions of matter, which are solvent resistant and are useful as potting compounds, adhesives, protective coatings, and for the production of laminates of various kinds.

Each of the following objects will be obtained by at least one of the aspects of this invention.

An object of this invention is to provide new resinous materials and the process for their production. A further object of this invention is to provide products by the reaction of epoxy compounds with polymers of herero-cyclic nitrogen bases having alkyl groups in the 2 and/or 4 positions on the heterocyclic ring of pyridine or quinoline (the 1 and/or 3 positions of isoquinoline). A further object of this invention is to provide new compositions of matter, these comprising the reaction products of polymers of 2- and 4-methylvinylpyridines and epoxy compounds.

Other objects and advantages of this invention will be apparent to one skilled in the art upon reading this specification.

Broadly speaking, the resins of our invention are prepared by reacting an epoxy compound with a polymer of a compound having the structural formula

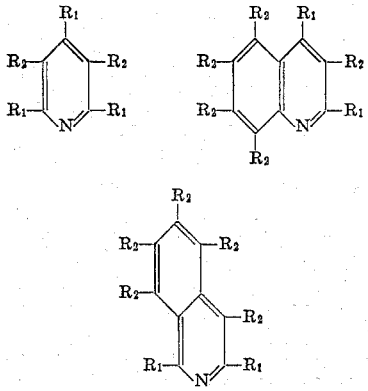

wherein $R_1$ and $R_2$ are, independently, selected from the group consisting of hydrogen, alkyl, vinyl, alpha-methylvinyl, nitro, alkoxy, halo, hydroxy, cyano, aryloxy, aryl, and combinations of these groups such as haloalkyl, alkylaryl, and hydroxyalkyl; at least one and not more than two of said groups being vinyl or alpha-methyl-vinyl; and at least one $R_1$ being an alkyl group containing not more than 8 carbon atoms and having at least one hydrogen atom on the alpha carbon atoms in said group. Preferred are polymers prepared from methylvinyl-pyridines in which the methyl group is in the 2 and/or 4 position.

As is apparent from the structural formulae, the active positions for the alkyl groups are the 2 and 4 positions on the pyridine or quinoline ring these being equivalent to the 1 and 3 positions on the isoquinoline ring. Also, concerning pyridine, the 6 position corresponds to the 2 position.

As a specific example of such a product, a portion of the molecule produced by the reaction of styrene oxide and poly-2-methyl-5-vinylpyridine can be illustrated as follows:

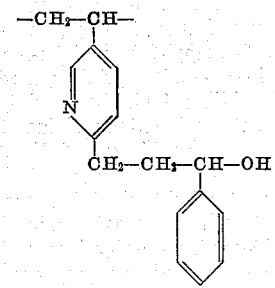

From this formula, it will be seen that such a product is produced by the reaction of the epoxy compound with the methyl group on the pyridine nucleus. Higher groups than the methyl groups also react with the epoxy compound, the reaction taking place at the alpha carbon. The reactivity decreases as the length and complexity of the attached alkyl group increases, but groups as high as the $C_8$ group can be employed. While not absolutely necessary, it is preferred to use compounds in which the alkyl groups are straight-chained, but branched chain substituents are also possible, keeping in mind the requirement that there be at least one hydrogen atom on the carbon atom alpha to the ring.

It should also be pointed out that a polyether chain can be formed by the condensation of more than one mol of the epoxy compound per reactive hydrogen on an alpha carbon in the polymer, i. e., the hydrogen of the OH group in the above formula can be replaced by a polyether chain.

The new compositions of this invention are prepared by the reaction of epoxy compounds with polymers of the substituted heterocyclic bases set forth above. Homopolymers, copolymers, terpolymers, etc., all produce valuable products. Monomers copolymerizable with these heterocyclic nitrogen bases include compounds containing an active $CH_2=C<$ group. Examples of such compounds which are widely used include styrene, substituted styrenes, such as alkyl, alkoxy, and halogen substituted styrenes; acrylonitrile; methacrylonitrile; methyl acrylate; methyl methacrylate; ethyl acrylate; butyl acrylate; conjugated dienes, such as 1,3-butadiene, isoprene, piperylene, methylpentadiene, 2,3-dimethyl-1,3-butadiene, chloroprene, and the like. Also polymers can be prepared from various mixtures of the heterocyclic nitrogen bases and one or more conjugated dienes and one or more polymerizable materials containing the vinyl or alpha-methylvinyl group set forth above. The preferred copolymerizable materials are conjugated dienes, such as pentadiene, methylpentadiene, isoprene, and the various hexadienes, but 1,3-butadiene is the preferred comonomer and the 2- and 4-methylvinyl-pyridines and butadiene produce the preferred copolymers. Preferably, the copolymer is made from a monomer mixture containing 70 to 90 parts by weight of butadiene per 100 parts of monomers.

The polymeric material which is reacted with the epoxy compound can range from liquid to rubbery to resinous material, depending upon the monomers employed and the method of preparation. For example, copolymers of a conjugated diene with a 2- and/or 4-methylvinylpyridine, when prepared by emulsion polymerization, can range from liquid to rubbery products, depending upon the amount of modifier employed in the polymerization recipe. The polymers should have a molecular weight of at least 300 and, preferably, at least 500 as determined by freezing point lowering in a suitable solvent.

Specific examples of heterocyclic nitrogen bases which can be utilized for the preparation of polymers used in the practice of this invention are 2-methyl-5-vinylpyridine; 4-methyl-2,5-divinylpyridine; 2,3,4-trimethyl-5-vinylpyridine; 3,4,5,6-tetramethyl-2-vinylpyridine; 4-octyl-3-vinylpyridine; 2 - ethyl - 6 - n - hexyl - 4 - vinylpyridine; 2-isopropyl-4-isobutyl-5-vinylpyridine; 2-isopropyl-4-nonyl-5-vinylpyridine; 2-methyl-5-undecyl-3-vinylpyridine; 2-n-butyl - 4,5 - divinylpyridine; 2,4 - dimethyl - 5,6 - dipentyl-3-vinyl-pyridine; 2-methyl-3,5-di(alpha-methylvinyl)pyridine; 2-vinyl-3-nitro-4-methylpyridine; 2-ethyl-4-chloro-5-methoxy-6-vinylpyridine; 2-vinyl-4-ethyl-5,6-dichloropyridine; 2-vinyl-4-pentoxy-6-methylpyridine; 2(para-methylphenyl)3-vinyl-4-methylpyridine; 1,6-dimethyl-3-vinylisoquinoline; 2-vinyl-4-ethylquinoline; 2-vinyl-3-benzyl-4-methylquinoline; 2-ethyl-3-vinyl-5-chloroethylquinoline; 1-methyl-3-vinyl-6-hydroxymethylisoquinoline; 1-vinyl-5 (hydroxyphenyl)3-methylisoquinoline; and the like. It will be noted that some of these compounds have alkyl groups attached to the ring which are longer than $C_8$ and others which have alkyl groups attached thereto with positions other than the 2 and 4 positions (1 and 3 positions for isoquinoline). These compounds are satisfactory for use in my invention as long as the previously established requirements are met. Thus, it will be seen that each of these compounds has at least one alkyl substituent containing less than 8 carbon atoms and at least one hydrogen atom on an alpha carbon attached at the 2 and/or 4 positions. The compounds preferred are those containing only one vinyl or alpha-methylvinyl group and one methyl group in the 2 and/or 4 positions. It is preferred that the total number of carbon atoms in the alkyl groups attached to the ring compound should not be greater than 12. The reaction can be continued as long as such alpha-hydrogen atoms are present, this providing for the reaction of as many as three mols of the epoxy compound with a methyl group in the proper position.

Broadly stated, polymers employed as starting materials for the resin herein described can be prepared by any method known to the art, such as mass or emulsion polymerization, and, as hereinbefore mentioned, can range from liquid to rubbery to solid resinous polymers. Thus, coming within this invention are polymers in which the heterocyclic nitrogen base ranges from 2 to 100 parts by weight and the material copolymerized therewith can range from 98 to 0 parts by weight per 100 parts of monomers, keeping in mind the preferred range previously set forth.

The epoxy compounds which are applicable are those having the formula

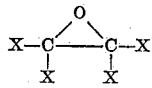

wherein X is a radical which
(1) Can be completely hydrocarbon in character including saturated aliphatic, saturated alicyclic, and aromatic radicals,
(2) Can contain ether linkages (C—O—C),
(3) Can contain halogen atoms,
(4) Can contain hydroxy radicals,
(5) Can be hydrogen, or
(6) Can contain any combination of the above radicals.

In addition, the two carbon atoms shown in the formula
(1) Can be part of a carbocyclic ring,
(2) Can be part of a heterocyclic ring containing carbon and oxygen atoms, or
(3) Can be part of an epoxy resin molecule which can also contain one or more of ether linkages, halogen atoms and hydroxy radicals.

The epoxides include the simplest, which is ethylene oxide, as well as those of complex structures such as the epoxy resins and can have a molecular weight ranging up to about 10,000 or more. They include materials which are normally gaseous, normally liquid and normally solid in character. As examples illustrating the types of compounds which are intended to be included are the following:

Ethylene oxide; propylene oxide (1,2-epoxypropane); butylene oxide (1,2-epoxybutane and 2,3-epoxybutane); 1,2-epoxypentane; 1,2-epoxy-3-methylbutane; 2,3-epoxy-3-methylbutane; 1,2-epoxy-2,4,4-trimethylpentane; 1,2-epoxycyclohexane; 1,2-epoxycyclooctane; 1,2-epoxy-4-cyclohexylpentane; 1,2-epoxyoctadecane; 1,2-epoxyeicosane; styrene oxide; 1,2-epoxy-3-chlorophenylpropane; 2,3-epoxy-5-ethoxydecane; 1,2-epoxy-4-chloromethylhexadecane; 1,2-epoxy-4-chlorocyclohexane; epichlorohydrin; epibromohydrin; 1,2-epoxy-4(2-hydroxyethyl)tridecane; and 5,6-epoxy-14-hydroxy-18-chloro-22-ethyltriacontane. The epoxy resins, complex mixtures of glycidyl ethers, can range in molecular weight from 250 to about 10,000 and have a formula which is represented by

where R represents the divalent hydrocarbon radical of a dihydric phenol and n is an integer of the series 0, 1, 2, 3, etc. Suitable dihydric phenols include mononuclear phenols like resorcinol, catechol, hydroquinone, etc., or polynuclear phenols like bis-(4-hydroxyphenyl)-2,2-propane (bisphenol), 4,4'-dihydroxy benzophenone, bis-(4-hydroxyphenyl)-1,1-ethane, bis-(4-hydroxyphenyl)-1,1-isobutane, bis-(4-hydroxyphenyl)-2,2-butane, bis-(4-hydroxy-2-methylphenyl)-2,2-propane, bis-(4-hydroxy-2-tertiary butyl phenyl)-2,2-propane, bis-(2-dihydroxynaphthyl)-methane, 1,5-dihydroxy napthalene, etc.

The most convenient way of setting forth the amount of epoxy compound employed in the practice of this invention is to calculate it on the basis of the hydrogen on alpha carbon atoms in the 2 and/or 4 positions on the heterocyclic nucleus. In this manner, the amount of epoxy compound is generally in the range between 0.1 and 10 mols, preferably between 0.5 and 5 mols, per alpha-hydrogen atom. However, the amount of epoxy compound used is preferably maintained at approximately a 1:1 weight ratio, based upon the weight of the polymer and seldom should exceed a 2:1 weight ratio on this basis.

In the process of this invention, the heterocyclic nitrogen base polymer is reacted with a liquid or solid epoxy compound, the preferred epoxy compound being a liquid. If the heterocyclic nitrogen base polymer is a liquid or a resin, and the epoxy compound is a liquid, the polymer is dissolved in the epoxy compound to form a free-flowing mixture. This mixture sets to an infusible resin as a result of the reaction of the epoxy compound with the hydrogen atoms on alpha-carbon atoms in the 2 and/or 4 positions in the polymer. If the polymer is a rubbery material, the addition of a liquid epoxy compound produces a pasty or putty-like material which sets to a resin after a period of time. Resins prepared from materials of this last type frequently have characteristics similar to that of vulcanized rubber. In instances where solid epoxy compounds are employed, such as some of the epoxy resins, we prefer to add a liquid plasticizer to the mixture to facilitate incorporation of the polymer into the epoxy compound. This is particularly true if the polymer is a rubbery or resinous material. Liquid plasticizers, such as dibutyl phthalate, various oils, such as Circosol 2XH (a green hydrocarbon oil), Paraflux (a commercial asphaltic flux), tricresyl phosphate, benzophenone, and phenoxyethyl stearate, are applicable. In some instances, we use a quaternizing agent along with the epoxy compound for reaction with the nitrogen atom in the polymer. In this case, two reactions take place, the epoxy compound reacting with the hydrogen atom in the 2 and/or 4 positions and the quaternizing agent reacting with the nitrogen atom. In a manner similar to the liquid plasticizers, liquid quaternizing agents facilitate incorporation of the polymer into a solid epoxy compound. Quaternizing agents which are applicable for use in preparing the quaternized polymers utilized herein include the various alkyl halides, such as methyl iodide, methyl bromide, ethyl iodide, propyl iodide, hexyl iodide, nonyl bromide, cetyl bromide; the various alkylene halides, such as ethylene iodide, ethylene bromide, propylene chloride, butene bromide, octene bromide; the various substituted alkanes and cycloalkanes necessarily including the above alkyl and alkylene halides, which contain at least one hydrogen atom attached to a carbon atom, such as bromoform, chloroform, ethylene chlorohydrin, acetyl chloride, iodoform, chloroacetyl chloride; alkyl sulfates, such as methyl sulfate, ethyl sulfate, and the various substituted aromatic compounds, such as picryl chloride, benzal chloride, benzotrichloride, methyl benzene sulfonate. Other materials which can be employed as quaternizing agents in the practice of this invention include the various polyhalogenated cycloalkenes, such as hexachlorocyclopentadiene. The foregoing enumeration is not intended to include all the possible suitable quaternizing agents, but is only representative, since many others can be used. Any organic compound which contains an active halogen atom attached to a carbon atom or contains a similar active quaternizing group and which is not an acid, is useful in my invention. In general, active quaternizing agents, such as organic halides, organic sulfates, and organic acid chlorides, and the like, which contain not more than 20 carbon atoms per molecule and contain at least one halogen or equivalent quaternizing group; for example, an alkyl arylsulfonate, an aryl alkylhalide, an alkyl sulfate, or the like, are satisfactory for the production of solid polymers from copolymers of a conjugated diene and a copolymerizable heterocyclic nitrogen base. Those compounds which contain the configuration

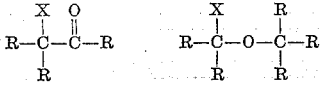

wherein X is a halogen atom, such as chlorine, bromine and iodine, and the R's represent oxygen, hydrogen or carbon valence linkages to their respective carbon atoms, are especially useful.

The reaction of a conjugated diene-heterocyclic nitrogen base copolymer with a quaternizing agent yields a product which contains characteristic nitrogen to carbon bonds in the recurring nitrogen base units of the polymers. In distinction, if the pyridine nucleus or portion of the copolymer were reacted with an acid acting substance (mineral acid, organic acid or the like), one of the two available nitrogen valences would be satisfied by a nitrogen to hydrogen bond and accordingly would not be a quaternized compound. The quaternary salts tend to be less water soluble than the unquaternized material whereas pyridinium salts formed by reaction with an acid acting compound (whereby a hydrogen atom attaches to a nitrogen atom) tend to be more water soluble. Furthermore, the quaternizing reaction is readily controlled since it proceeds rather slowly, the reaction with an acid being very rapid. Quaternary salts are distinguished over the other pyridinium or quinolinium salts in that they are derived from strong bases. Also pyridinium or quinolinium salts (other than a quaternary salt) form free pyridine or quinoline, water and a salt when reacted with a strong base. Therefore, suitable quaternizing agents are those compounds which, when reacted with the nitrogen atom of the heterocyclic base nucleus, do not attach or link a hydrogen atom thereto. Expressed differently, the quaternizing agents of this invention are those compounds X Y which react with the nitrogen atoms of the heterocyclic base nuclei of the copolymer or with a compound, such as pyridine or quinoline, to yield a material which may be characterized by the formulas

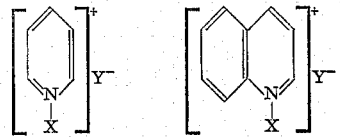

or

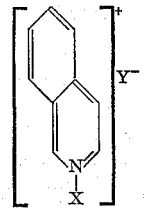

wherein X may be any molecular fragment, such as an organic radical, other than hydrogen, and Y is the remaining molecular fragment, such as an atom or radical (anion). This reaction is more fully described in Pritchard copending application, Serial No. 284,448, filed April 25, 1952, now abandoned.

Other compounding ingredients can also be added to the polymer, such as fillers, vulcanizing agents, vulcanization accelerators, reinforcing agents, antioxidants, and the like, along with the epoxy compound. In such cases, a quaternizing agent can also be present.

It is clear from the foregoing discussion that the consistency of the mixture containing a polymer of a heterocyclic nitrogen base, such as a 2-methyl-5-vinylpyridine polymer, and an epoxy compound, together with such other ingredients as desired, depends upon many factors. The uses of such mixtures depends, at least partially, upon the consistency of these mixtures prior to the reaction of the ingredients.

The time required for the reaction of the epoxy compound with the polymer depends upon the temperature, as well as the particular ingredients employed. At room temperature, i. e., around 70 to 80° F., a liquid mixture of an epoxy compound and a 2-methyl-5-vinylpyridine polymer sets to a solid resin in 10 to 24 hours. Generally speaking, the temperature can be in the range between 60 and 400° F., preferably between 70 and 350° F., and the time will be in the range between 5 minutes and 120 hours, preferably between 15 minutes and 50 hours. It is sometimes preferred to start the reaction at a low temperature and increase the temperature as the reaction proceeds.

Most of the products are difficultly fusible resins which range from rubbery to hard materials, they are useful as potting compounds for transformers and various other electrical uses. They are also valuable for the production of laminates, such as fiber glass laminates. A particular advantage present in these materials is that they can be cured without pressure at room temperature. This last property also makes them useful as self-drying coating materials, these being applied before the reaction occurs. Following the reaction, the coating is a hard resinous one.

This application is related to copending applications of Pritchard and Canterino, Serial No. 445,455, filed July 23, 1954, and Pritchard and Canterino, Serial No. 445,456, filed July 23, 1954. In the first of these, 2-hydroxy alkyl quaternary salts are described, the reaction there being one between epoxy compounds and acid salts of these heterocyclic nitrogen base polymers. They are, in effect, a particular group of quaternary ammonium compounds. In the second, we have described the use of epoxy compounds similar to those described in the instant application but which have molecular weights of 90 and above, as plasticizers for quaternized heterocyclic nitrogen base polymers. Where no carbon atoms in the 2 or 4 position on the ring contain a hydrogen atom, this plasticizing effect is a permanent one, and where such a hydrogen atom is present, the plasticizing effect is a temporary one, the polymer setting up to a resinous material, as set forth in the present application.

Examples of the materials and processes of this invention are presented herewith, these providing preferred methods of operation, but should not be considered as unduly limiting the invention.

Example I

Poly-2-methyl-5-vinylpyridine was prepared by polymerization at 122° F. using the following recipe:

| | Parts by weight |
|---|---|
| 2-methyl-5-vinylpyridine | 100 |
| Water | 180 |
| $K_2S_2O_8$ | 0.9 |
| $NaHSO_3$ | 0.5 |
| Acetic acid, glacial | 50 |

The polymer was coagulated by the addition of sodium hydroxide and was washed with water and dried.

The dry polymer was treated with styrene oxide using one mol styrene oxide per methyl unit in the polymer. The polymer dissolved in the styrene oxide to give a dark amber solution. Upon standing at room temperature (approximately 70–75° F.), for 24 hours, a hard thermosetting resin was formed.

Poly-2-vinylpyridine was prepared in the manner described above for poly-2-methyl-5-vinylpyridine and treated with styrene oxide using one mol styrene oxide per pyridine unit. The polymer dissolved to give a dark amber solution but no reaction occurred upon standing. The mixture was heated at 140° F. for 24 hours and a viscous solution remained. There was no evidence of reaction.

Example II

Poly-2-methyl-5-vinylpyridine, prepared as described in Example I, was treated with epichlorohydrin using one mol of the epichlorohydrin per methyl unit in the polymer. The polymer dissolved to give a dark amber solution which set to a hard resin after standing 24 hours at room temperature.

Example III

A 60/40 butadiene/2-methyl-5-vinylpyridine copolymer was prepared by emulsion polymerization at 122° F. in accordance with the following recipe:

| | Parts by weight |
|---|---|
| Butadiene | 60 |
| 2-methyl-5-vinylpyridine | 40 |
| Water | 180 |
| Sodium fatty acid soap | 5 |
| $K_2S_2O_8$ | 0.3 |
| Mercaptan blend [1] | 0.3 |

[1] A blend of tertiary $C_{12}$, $C_{14}$ and $C_{16}$ aliphatic mercaptans in a ratio of 3 : 1 : 1 parts by weight.

The polymer, after being coagulated and dried, was treated with styrene oxide using one mol of the epoxy compound per methyl unit in the polymer. A putty-like mass resulted which set to a product resembling vulcanized rubber after standing at room temperature 24 hours.

Example IV

An 85/15 butadiene/2-methyl-5-vinylpyridine copolymer, prepared by emulsion polymerization at 122° F. and having a Mooney value (ML-4) of 60, was compounded in accordance with the recipe given below. Two samples were compounded without a quaternizing agent and in two samples benzal chloride was present. Two epoxy compounds were employed, styrene oxide and an Epon resin (Epon Adhesive VI).

| | Parts by weight |
|---|---|
| Butadiene/2-methyl-5-vinylpyridine copolymer | 100 |
| Carbon black (Philblack A) | 60 |
| Zinc oxide | 3.0 |
| Sulfur | 1.5 |
| Altax [1] | 1.5 |
| Stearic acid | 1.5 |
| Benzal chloride | 0 or 20 |
| Epoxy compound | 20 |

[1] Benzothiazyl disulfide.

The compounded samples were cured 45 minutes at 307° F. and physical properties determined. Tests for swelling and extractibility were made by immersing weighed samples in a mixture containing 60 percent diisobutylene and 40 percent aromatics (a mixture of benzene, toluene, and xylenes) at 158° F. for 48 hours. The volume percent swell was determined by noting the volume of a test specimen before and after immersion in the liquid hydrocarbon mixture. Extractibility was determined by drying the sample at 158° F. for 48 hours and weighing it. From the difference in weight before and after immersion in the liquid hydrocarbon mixture, the extractibility was calculated. Low temperature properties were determined by the low temperature retraction test. In this operation a test specimen of certain dimensions is elongated 50 percent, placed in a Dry Ice-acetone bath at —72° C. for 3 minutes, and then released. The bath is allowed to warm slowly and the temperature at which the samples retract certain predetermined lengths are recorded as T–R values. Results of the various tests on the different samples are shown in the following table:

| | | | | |
|---|---|---|---|---|
| Benzal chloride [1] | | | 20 | 20 |
| Epon adhesive [1] | 20 | | 20 | |
| Styrene oxide [1] | | 20 | | 20 |
| Tensile strength, p. s. i. | 2,110 | 1,880 | 2,260 | 2,435 |
| Elongation, percent | 290 | 285 | 205 | 245 |
| Swell, percent | 183 | 148 | 73 | 72 |
| Extractability, percent | 7 | 12 | 8 | 11 |
| Shore hardness | 75 | 69 | 83 | 77 |
| T–R data:[2] | | | | |
| $T_1$ | 71 | 69 | 70 | 69 |
| $T_3$ | 70 | 67 | 60 | 60 |
| $T_5$ | 68 | 64 | 50 | 52 |
| $T_{10}$ | 65 | 62 | 30 | 43 |
| $T_{20}$ | 59 | 58 | 26 | 34 |
| $T_{30}$ | 57 | 55 | 21 | 29 |
| $T_{40}$ | 54 | 53 | 18 | 24 |
| $T_{60}$ | 48 | 50 | 14 | 22 |

[1] Parts by weight per 100 parts rubber.
[2] ASTM D-599-40T.

Example V

A homopolymer of 2-methyl-5-vinylpyridine was prepared by polymerization at 122° F. using the following recipe:

| | Parts by weight |
|---|---|
| 2-methyl-5-vinylpyridine | 100 |
| Glacial acetic acid | 50 |
| Water | 300 |
| Potassium persulfate | 0.9 |
| Sodium bisulfite | 0.5 |

Quantitative conversion was obtained in about 2 hours after which the polymer was coagulated by the addition of a sodium hydroxide solution. This polymer, a solid, was then mixed with styrene oxide and benzal chloride on a 1:1:1 mol ratio per pyridine unit. That is to say that 101 parts by weight of styrene oxide and 135 parts by weight of benzal chloride were mixed with 100 parts by weight of the polymer. This mixture was converted from a liquid to a solid within 4 hours at 25° C. and was subsequently heated for 15 hours at 65° C. The product, a shiny black solid, had a Shore D hardness of 75.

*Example VI*

A homopolymer of 2-vinylpyridine was prepared at 122° C. according to the following recipe:

| | Parts by weight |
|---|---|
| 2-vinylpyridine | 100 |
| HCl | 30 |
| Water | 300 |
| Potassium persulfate | 0.9 |
| Sodium bisulfite | 0.5 |

Quantitative conversion was obtained in approximately 2 hours and the polymer was coagulated by the addition of sodium hydroxide solution. The solid polymer, after recovery, was mixed with styrene oxide and benzal chloride in a 1:1:1 mol ratio per pyridine unit, this ratio being the same as that used in Example V. In other words, 114 parts by weight of styrene oxide and 153 parts by weight of benzal chloride were mixed with 100 parts by weight of the polymer. The mixture was cured according to the conditions of Example V. At 25° C., no evidence of cure was apparent, the mixture remaining fluid. After the 15 hours at 65° C., a soft crumbly material resulted which had a Shore D hardness of 2.

It should be understood that many variations and modifications are possible in the preferred procedure set forth above without departing from the basic concept of our invention.

We claim:

1. A thermosetting resin comprising the reaction product of an epoxy compound wherein an oxygen atom bridges adjacent carbon atoms, said carbon atoms, being joined by a single valence bond, said epoxy compound containing atoms selected from the group consisting of carbon, hydrogen, oxygen, and halogen in which oxygen atoms are present exclusively in radicals selected from the group consisting of hydroxyl and ether linkages, and a polymer of a compound having a structure selected from the group consisting of

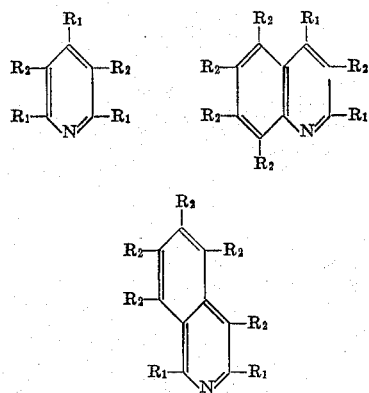

wherein at least one and not more than two of $R_1$ and $R_2$ are selected from the group consisting of vinyl and alpha-methylvinyl and at least one $R_1$ being alkyl containing not over 8 carbon atoms and having at least one hydrogen atom on an alpha carbon atom, $R_1$ and $R_2$ not otherwise substituted being hydrogen.

2. The resin of claim 1 in which said epoxy compound is selected from the group consisting of styrene oxide, epichlorohydrin, butylene oxide and epoxy resins.

3. A thermosetting resin comprising the reaction product of an epoxy compound, wherein an oxygen atom bridges adjacent carbon atoms, said carbon atoms being joined by a single valence bond, said epoxy compound containing atoms selected from the group consisting of carbon, hydrogen, oxygen, and halogen in which oxygen atoms are present exclusively in radicals selected from the group consisting of hydroxyl and ether linkages, and a polymer of a 2-alkylvinylpyridine, said alkylvinylpyridine containing not over 8 carbon atoms in the alkyl group.

4. The resin of claim 3 in which said polymer is a copolymer of said alkyl vinylpyridine and a 1,3-conjugated diene.

5. A thermosetting resin comprising the reaction product of an epoxy compound wherein an oxygen atom bridges adjacent carbon atoms, said carbon atoms being joined by a single valence bond, said epoxy compound containing atoms selected from the group consisting of carbon, hydrogen, oxygen, and halogen in which oxygen atoms are present exclusively in radicals selected from the group consisting of hydroxyl and ether linkages, and a copolymer of 2-methyl-5-vinylpyridine and 1,3-butadiene.

6. The copolymer of claim 5 in which the amount of epoxy compound is in the range of from 0.1 to 10 mols per hydrogen atom in said methyl group.

7. The method of preparing a thermosetting resin which comprises mixing an epoxy compound wherein an oxygen atom bridges adjacent carbon atoms, said carbon atoms being joined by a single valence bond, said epoxy compound containing atoms selected from the group consisting of carbon, hydrogen, oxygen, and halogen in which oxygen atoms are present exclusively in radicals selected from the group consisting of hydroxyl and ether linkages, and a polymer of a compound selected from the group consisting of

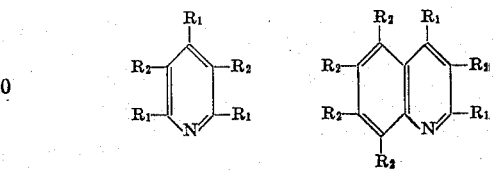

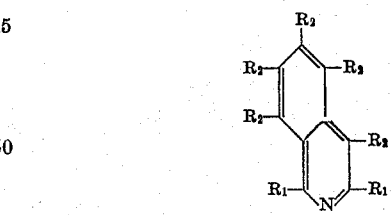

wherein at least one and not more than two of $R_1$ and $R_2$ are selected from the group consisting of vinyl and alpha-methylvinyl and at least one $R_1$ being alkyl containing not over 8 carbon atoms and having at least one hydrogen atom on an alpha carbon, $R_1$ and $R_2$ not otherwise substituted being hydrogen; heating the resulting mixture to form a thermosetting resin, said heating being conducted at a temperature of 60 to 400° F. for 5 minutes to 120 hours.

8. The process of claim 7 in which said temperature is in the range of 70 to 350° F. for a time of 15 minutes to 50 hours.

References Cited in the file of this patent

UNITED STATES PATENTS

| 2,570,632 | Barton | Oct. 9, 1951 |
| 2,662,870 | Allenby | Dec. 15, 1953 |
| 2,688,008 | Chaney et al. | Aug. 31, 1954 |